United States Patent
Nagahashi et al.

(10) Patent No.: US 7,347,169 B2
(45) Date of Patent: Mar. 25, 2008

(54) COOLING OIL DELIVERY STRUCTURE FOR A VEHICULAR GENERATOR, AND ENGINE INCLUDING SAME

(75) Inventors: Yoshiki Nagahashi, Saitama (JP);
Masaki Yoneyama, Saitama (JP);
Naoki Kono, Saitama (JP); Kohji Minami, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/711,268

(22) Filed: Feb. 27, 2007

(65) Prior Publication Data
US 2007/0200439 A1 Aug. 30, 2007

(30) Foreign Application Priority Data
Feb. 28, 2006 (JP) ............................. 2006-052762

(51) Int. Cl.
*F01P 1/06* (2006.01)
*H02K 9/00* (2006.01)
(52) U.S. Cl. ............................. 123/41.35; 123/41.31; 310/54
(58) Field of Classification Search ............. 123/41.31, 123/41.33, 41.35–41.39; 310/52, 54
See application file for complete search history.

(56) References Cited

U.S. PATENT DOCUMENTS

| 5,078,105 A | 1/1992 | Ito et al. |
| 5,509,381 A * | 4/1996 | Fisher ...................... 123/41.31 |
| 5,619,956 A | 4/1997 | Koziara et al. |
| 5,931,135 A | 8/1999 | Yamada |

| 2001/0042526 A1 * | 11/2001 | Moller et al. ............. 123/41.35 |
| 2003/0041815 A1 | 3/2003 | Kawakubo et al. |
| 2003/0098203 A1 | 5/2003 | Kunimitsu et al. |

FOREIGN PATENT DOCUMENTS

| DE | 19645691 | 5/1998 |
| DE | 19756390 | 6/1999 |
| DE | 19949929 | 1/2001 |
| DE | 10102764 | 7/2002 |
| EP | 0369618 | 5/1990 |
| EP | 1288460 | 3/2003 |
| JP | 58-053637 | 3/1983 |
| JP | 02-13688 | 4/1990 |
| JP | 10-122042 | 5/1998 |
| JP | 2986470 | 10/1999 |
| JP | 2002-235548 | 8/2002 |
| JP | 2003-074347 | 3/2003 |

* cited by examiner

*Primary Examiner*—Noah P. Kamen
(74) *Attorney, Agent, or Firm*—Carrier, Blackman & Associates, P.C.; William D. Blackman; Joseph P. Carrier

(57) ABSTRACT

In an engine having a generator mounted thereon, an oil passage is formed within the engine's crankcase to supply oil to an oil jet for cooling one or more pistons. In addition, oil is supplied to an oil jet for cooling the generator, using the oil passage in common with the oil supply for cooling the piston, without requiring a separate, dedicated oil passage for the generator. The cooling oil delivery structure is provided for cooling the generator which is located at one end of the crankshaft. The oil passage for cooling pistons, which includes an oil jet for cooling each respective piston by jetting oil to the piston, is arranged on an axis substantially parallel to the crankshaft. A generator-cooling oil jet is provided on the crankcase at a terminal end of, and in fluid communication with the oil passage for cooling the pistons.

20 Claims, 10 Drawing Sheets

COOLING OIL DELIVERY STRUCTURE FOR A VEHICULAR GENERATOR, AND ENGINE INCLUDING SAME

CROSS-REFERENCE TO RELATED APPLICATIONS

The present invention claims priority under 35 USC 119 based on Japanese patent application No. 2006-052762, filed on Feb. 28, 2006. The entire subject matter of this priority document, including claims, drawings, and specification is incorporated by reference herein.

BACKGROUND OF THE INVENTION

1. Field of the Invention

The present invention relates generally to internal combustion engines equipped with generators. More particularly, the present invention relates to improved structure for cooling a vehicular generator mounted on an internal combustion engine, by splashing the generator internally with cooled engine oil from the engine's oiling system.

2. Description of the Background Art

It is known in the art to provide a cooling structure for a generator in a vehicle. In one example of a previously known cooling structure for a vehicular generator, oil is sprayed on an outer rotor of the generator by jetting oil toward an annular space formed between a peripheral surface of the outer rotor and an inner surface of a generator cover. A generator employing such a cooling structure is disclosed, for example, in JP Patent No. 2986470.

In the structure for cooling the generator disclosed in JP Patent No. 2986470, a jet nozzle (an oil jet) directs a jet of oil toward the annular space between the generator's outer rotor and the inner surface of the generator cover. The jet nozzle is fitted and fastened into an end of a dedicated oil passage bored in an engine crankcase, where the passage is provided for use in cooling the generator.

In the disclosure of JP Patent No. 2986470, the oil passage for cooling the generator communicates with an oil gallery in the crankcase. Therefore, oil discharged by the drive of an oil pump reaches the oil passage, formed for cooling the generator, through the oil gallery, and is jetted outwardly from the jet nozzle toward the generator's annular space.

In the structure for cooling the generator disclosed in JP Patent No. 2986470 as described above, a dedicated oil passage is required to be formed in the crankcase to cool the generator, where this oil passage is used only to deliver oil to the oil jet, and thus a process for forming the dedicated passage in the crankcase is required, whereby the manufacturing cost is increased.

In addition, since a path of the oil passage that reaches the required position in which the jet nozzle is arranged is required to be determined in consideration of the overall form and workability of the crankcase, it is not easy to form a compact crankcase which includes the oil passage.

The present invention is made in view of the above-described problem, and it is one object of the invention to provide cooling oil delivery structure for a vehicular generator in which oil is supplied to an oil jet in a required position, is jetted from the oil jet and can cool the generator, without requiring formation of a dedicated oil passage for supplying oil to cool the generator.

SUMMARY

To achieve the above object, a first aspect of the invention relates to a generator cooling oil delivery structure for delivering cooling oil to a vehicular generator which is provided on one end of an engine crankshaft, where the cooling oil delivery structure cools the generator by jetting oil thereto during engine operation. According to the first aspect of the invention, a piston cooling oil passage is formed in the crankcase and arranged on an axis parallel to the crankshaft, for delivering engine oil to a piston cooling oil jet, where this oil is used for jetting oil to the piston; and this passage is made to serve a dual function, because a generator cooling oil jet that cools the generator by jetting oil thereto is provided extending from an end of the piston cooling oil passage.

In the generator cooling oil delivery structure for the vehicular generator according to the first aspect of the invention, the oil jet, for cooling the generator by jetting oil thereto, is provided connected to and extending from a distal end of the piston cooling oil passage, in which intermediate portions of the piston cooling passage are adapted to provide jetted oil for cooling respective pistons. As a result, there is no need to form a dedicated oil passage for exclusively supplying generator-cooling oil to the generator-cooling oil jet. Because a dedicate oil passage for the generator is not required according to the first aspect of the invention, working man-hours are reduced, and the manufacturing cost can be reduced.

A second aspect of the invention is based upon the cooling oil delivery structure for the vehicular generator according to the first aspect thereof. In the second aspect of the invention, an engine speed sensor, that is operable to sense engine speed by detecting a number of revolutions of the crankshaft in a predetermined time period, is arranged adjacent to a space provided around the generator toward which oil is jetted from the generator-cooling oil jet.

In the cooling oil delivery structure for the vehicular generator according to the second aspect of the invention, the engine speed sensor is arranged adjacent to the space around the generator toward which oil is jetted from the generator-cooling oil jet. As a result, the space toward which oil is jetted from the generator-cooling oil jet can be secured as an area for housing the engine speed sensor, and the generator can therefore be uniformly and efficiently cooled without enlarging the internal combustion engine.

A third aspect of the invention is based upon the cooling oil delivery structure for the vehicular generator of either the first or second aspects thereof, in which the generator-cooling oil jet is located outside the generator when the oil jet is viewed in an axial direction of the crankshaft, and jets oil in a direction substantially parallel to the axis of the crankshaft.

In the cooling oil delivery structure for the vehicular generator according to the third aspect of the invention, the generator-cooling oil jet is located outside the generator when the oil jet is viewed in an axial direction of the crankshaft, and jets oil in a direction substantially parallel to the crankshaft axis. As a result, the space toward which oil is jetted from the generator-cooling oil jet is the space around the generator, and as oil is not jetted directly on to the generator, friction resistance to the turning of the rotor of the generator is never increased.

Modes for carrying out the present invention are explained below by reference to an embodiment of the present invention shown in the attached drawings. The above-mentioned object, other objects, characteristics and advantages of the present invention will become apparent form the detailed description of the embodiment of the invention presented below, in conjunction with the attached drawings.

BRIEF DESCRIPTION OF THE DRAWINGS

FIG. 4$i$ is an enlarged detail view of the portion of FIG. 4 located inside of the circle 4$i$;

DETAILED DESCRIPTION

Figure 1:
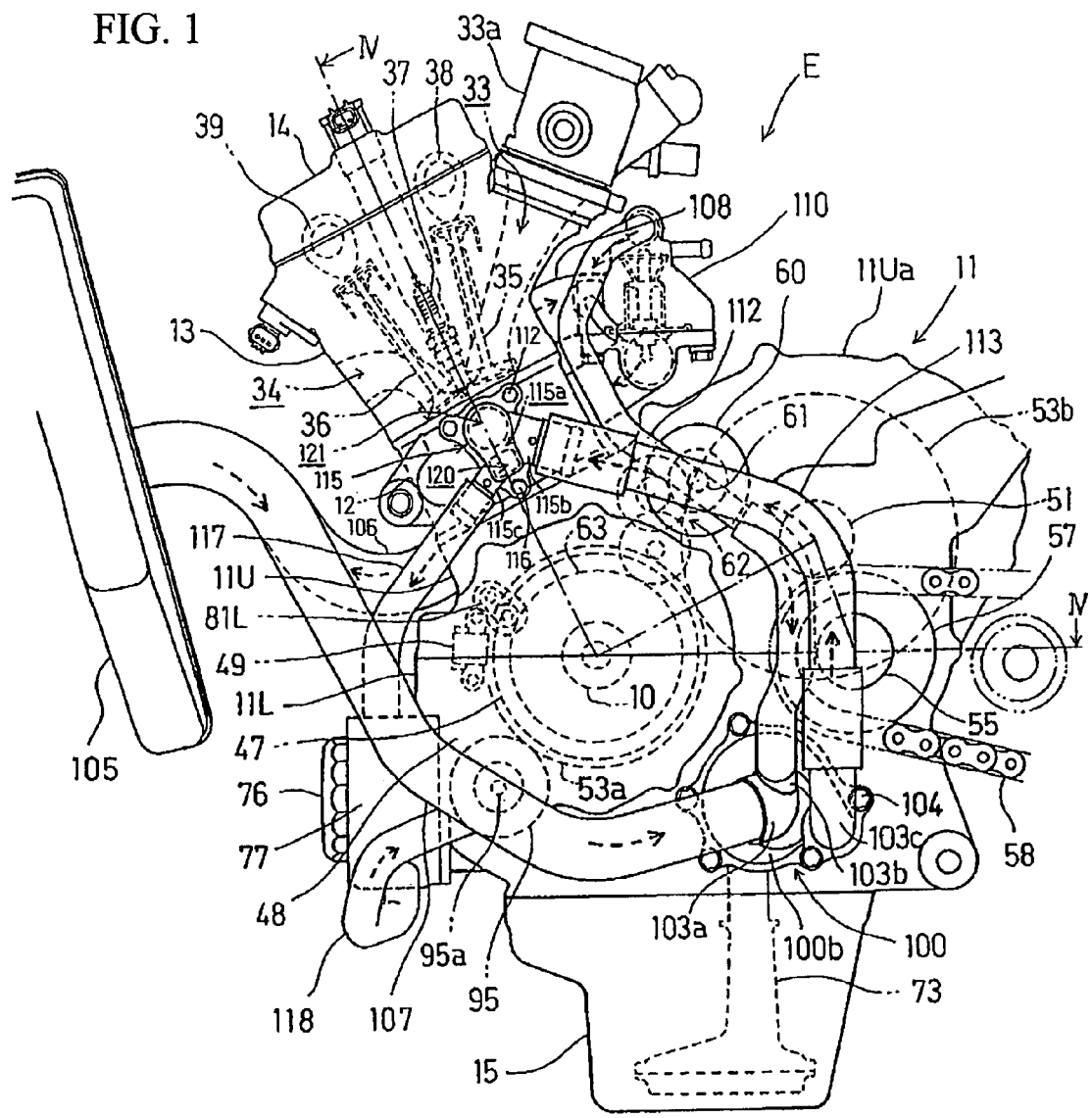
FIG. 1 is a left side plan view of an internal combustion engine incorporating a generator cooling oil delivery structure according to a selected illustrative embodiment of the invention, showing the hose arrangement corresponding to the engine cooling system, and showing selected internal engine parts in phantom.

A selected illustrative embodiment of the invention will now be described in some detail, with reference to FIGS. 1 to 10. It should be understood that only structures considered necessary for clarifying the present invention are described herein. Other conventional structures, and those of ancillary and auxiliary components of the system, are assumed to be known and understood by those skilled in the art.

The illustrative embodiment of the cooling oil delivery structure for a vehicular generator is described herein in association with an internal combustion engine E. The engine E may, for example, be provided as a four-cylinder in-line, water-cooled internal combustion engine, where the four cylinders are arranged in series, and this engine may be transversely mounted in a motorcycle with a crankshaft 10 directed sideways, transverse to a longitudinal axis of the motorcycle.

In this specification, a reference to "forward" refers to a forward direction of the vehicle, a reference to "backward" refers the rearward direction of the vehicle, and references to "right" and "left" are made in relation to the vantage point of a driver seated on the motorcycle and facing in a forward direction of the vehicle.

In the engine E, a crankcase 11 that supportively receives and journals the crankshaft 10 is vertically divided, and four cylinders 12$c$ are arrayed in series on an upper crankcase 11U. A cylinder head 13 overlies, and is integrated with, a cylinder block 12, with each of the cylinder block 12 and the cylinder head 13 slightly inclined in the forward direction. In addition, the cylinder head 13 is covered with a cylinder head cover 14, and an oil pan 15 is attached under a lower crankcase 11L.

Figure 4:
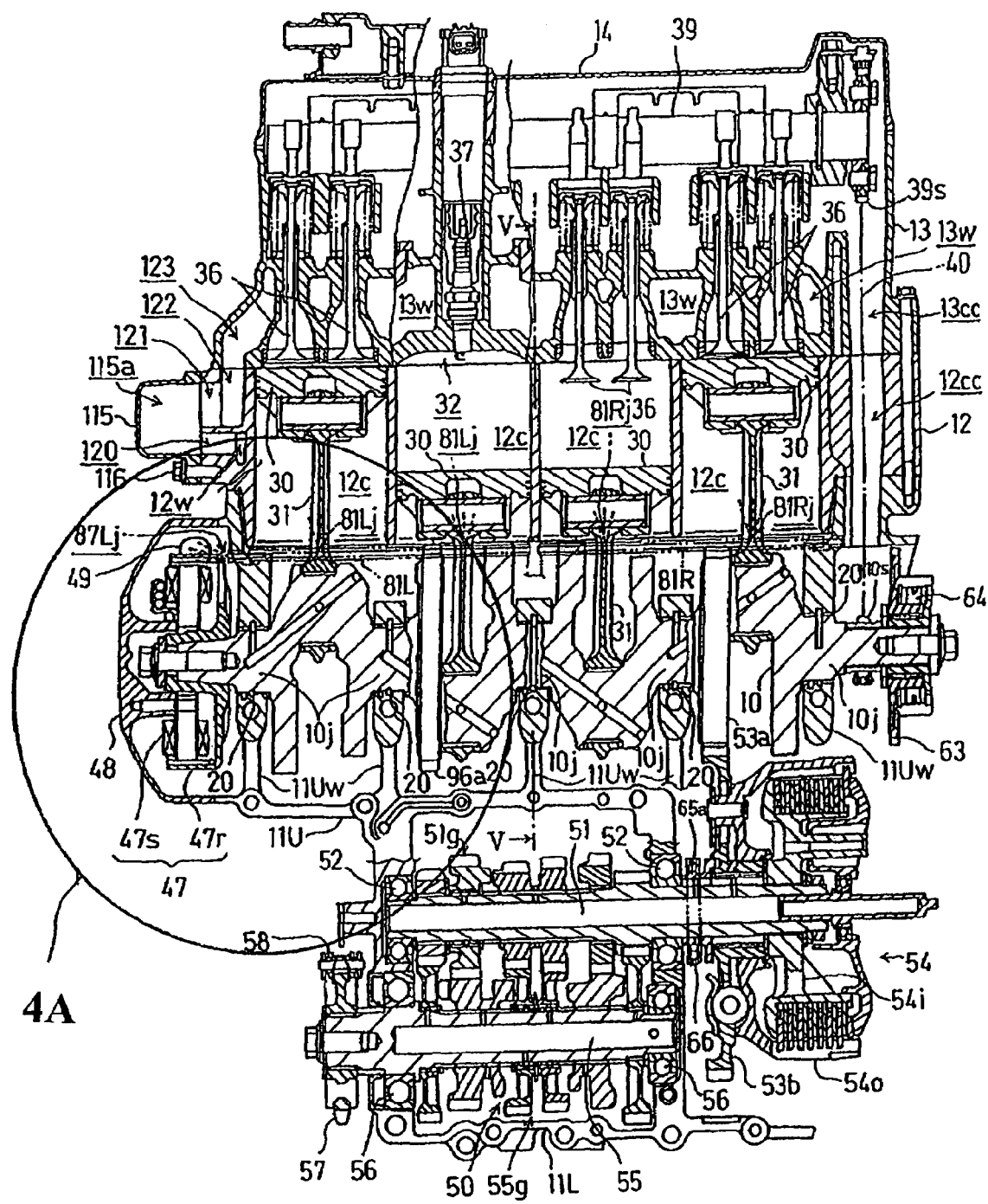
FIG. 4 is a front sectional view of the internal combustion engine of FIGS. 1-3, viewed along a line IV-IV in FIG. 1.
Figure 4A:
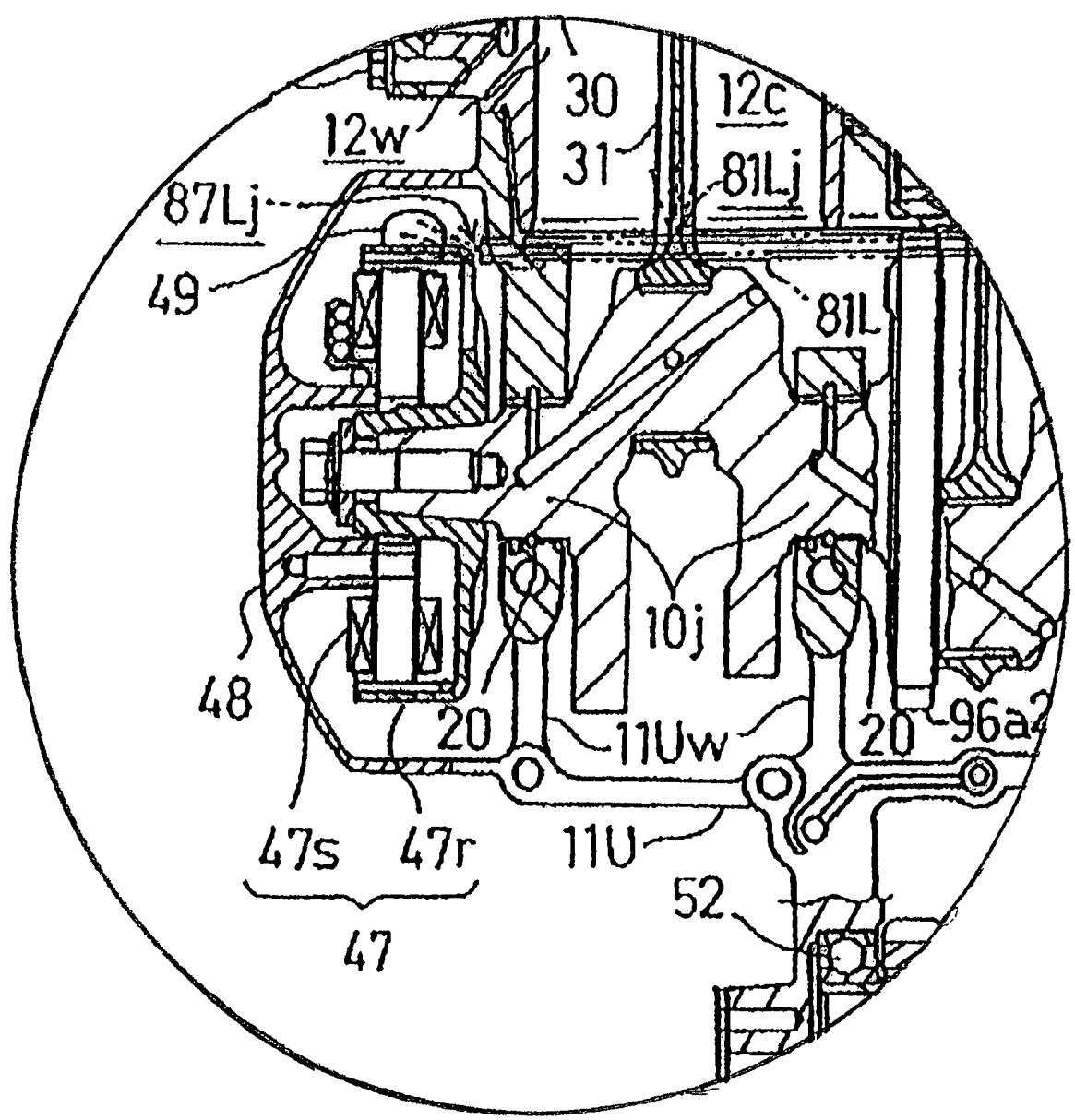
Figure 5:
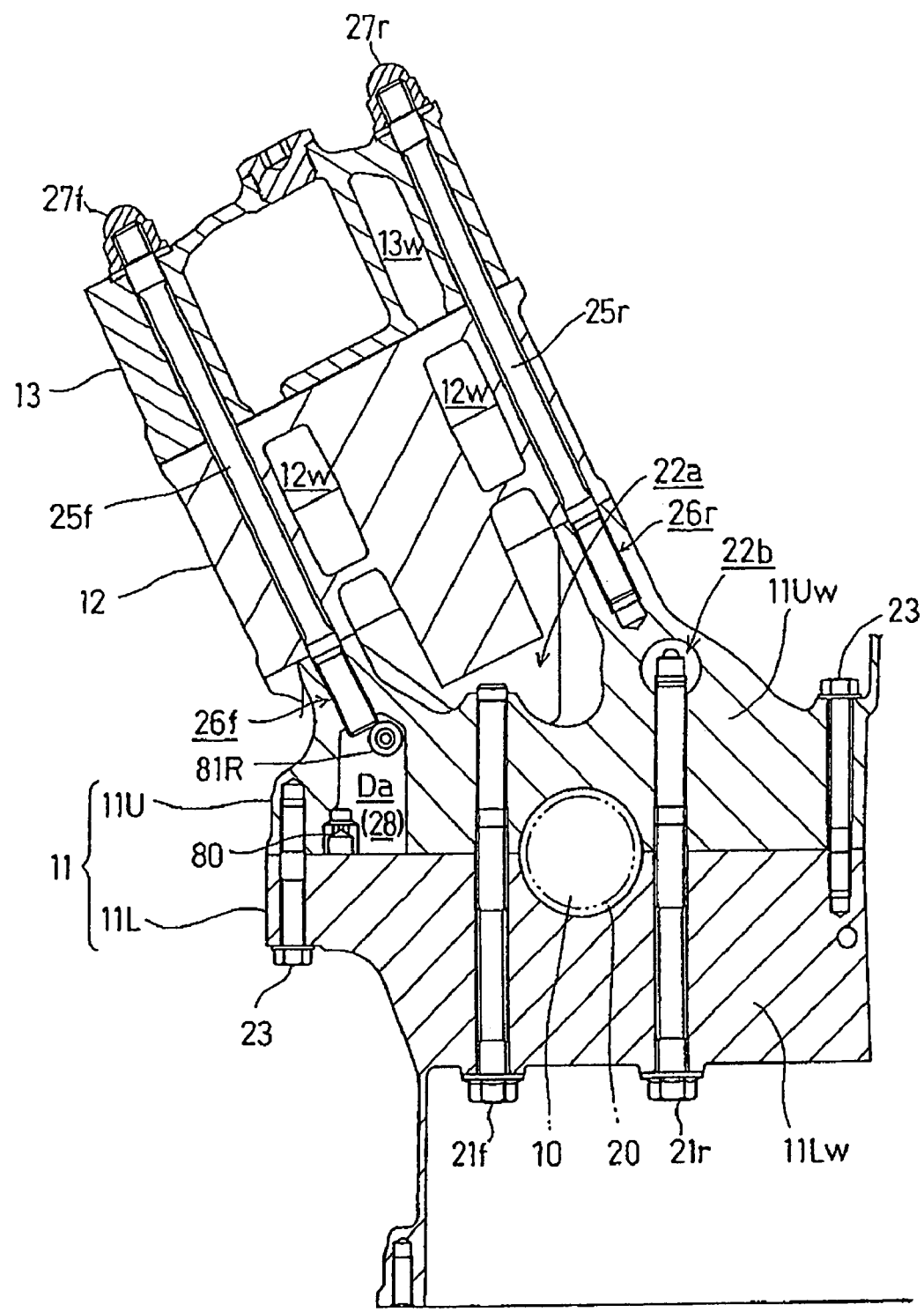
FIG. 5 is a schematic left side sectional detail view showing a portion of the crankcase of the internal combustion engine of FIGS. 1-4, as viewed along a line V-V in FIG. 4.

Referring to FIGS. 4 and 5, each journal wall 11Uw, 11Lw of the upper crankcase 11U and the lower crankcase 11L supports a journal 10$j$ of the crankshaft 10 via a main bearing 20 with the journal vertically held between the journal walls, and in this way, the crankcase 11 holds and rotatably supports the crankshaft 10. Because the internal combustion engine according to the depicted embodiment is a 4-cylinder in-line internal combustion engine E, the crankshaft 10 is provided with five journals 10$j$ and is rotatably supported by each of five upper and lower journal walls 11Uw, 11Lw of the upper crankcase 11U and the lower crankcase 11L, respectively. The upper crankcase 11U and the lower crankcase 11L are integrally fastened together by bolts by joining their respective faces.

Referring to FIG. 5, in each of each five journal walls 11Uw, 11Lw of the upper crankcase 11U and the lower crankcase 11L, front and rear stud bolts 21$f$, 21$r$ pierce the lower crankcase 11L straight upward from the lower side thereof, are screwed into long tapped holes of the upper crankcase 11U, and are tightened. Each of the upper crankcase 11U and the lower crankcase 11L are provided with confronting semicircular parts sized and shaped to hold the crankshaft 10 therebetween, where the semicircular parts are formed between the stud bolts 21$f$, 21$r$.

The distal end of the front stud bolt 21$f$, provided on the front side of the semicircular part, protrudes into a cavity 22$a$ of the crankcase after the stud bolt is screwed into the tapped hole of the upper crankcase 11U.

The distal end of the rear stud bolt 21$r$, provided on the rear side of the semicircular part, protrudes into a circular hole 22$b$, bored in parallel with the crankshaft 10 in the upper crankcase 11U, after the stud bolt is screwed into the tapped hole of the upper crankcase 11U. Therefore, the concentration in a part of stress, which is caused by screwing and tightening the stud bolts 21$f$, 21$r$, and which acts on the vicinity of the tapped holes, is reduced.

The upper crankcase 11U and the lower crankcase 11L are fastened, not only by the stud bolts 21$f$, 21$r$, but are also fastened by plural bolts 23 in required locations (see FIG. 5).

The cylinder block 12 is superimposed on the upper crankcase 11U by mutually joining faces thereof in a state in which the cylinder block is tilted forward slightly. The cylinder head 13 is superimposed on the cylinder block 12, and front and rear stud bolts 25$f$, 25$r$ fit into holes in the cylinder head 13 from above, pass through the cylinder block 12, and enter into a threaded portion of the journal wall 11Uw of the upper crankcase 11U, which adjoins the cylinder block 12. The stud bolts 25$f$, 25$r$ are screwed into tapped holes 26$f$, 26$r$ bored in the upper crankcase 11U, whereby the cylinder block and the cylinder head are integrally fastened.

Specifically, lower ends of the stud bolts 25$f$, 25$r$ are screwed into the tapped holes 26$f$, 26$r$ formed in the upper crankcase 11U beneath the joined face of the upper crankcase 11U. In addition, the stud bolts 25$f$, 25$r$ protrude upward in an embedded state, through holes of the cylinder block 12 which are fitted to the stud bolts 25f, 25r, so that the cylinder block 12 is superimposed on the upper face of the upper crankcase 11U. The through holes formed in the cylinder head 13 are fitted to the stud bolts 25f, 25r, and are aligned with the through holes of the cylinder block 12. Via the stud bolts 25f, 25r extending through the through holes and protruding from them, the cylinder head 13 is superimposed on an upper joined face of the cylinder block 12. The stud bolts 25f, 25r are further screwed into the tapped holes 26f, 26r together with cap nuts 27f, 27r by screwing cap nuts 27f, 27r on male screws formed at the upper (proximal) ends of the stud bolts 25f, 25r that protrude from the through holes of the cylinder head 13. By tightening nuts 27f, 27r, the cylinder block 12 and the cylinder head 13 are integrally fastened to the upper crankcase 11U.

A cavity 28 is formed in the three journal walls 11Uw in the center of the upper crankcase 11U so that the cavity is open to the joined face of the of the upper 11U and lower 11L portions of the crank case 11, and so that the front tapped hole 26f extends through the joined face of the upper crankcase 11U and the cylinder block 12, into the cylinder block 12, and reaches the cavity 28.

The stud bolt 25f that pierces the cylinder head 13 and the cylinder block 12 is screwed into the tapped hole 26f and the distal end is open to the cavity 28. Therefore, the concentration in a part of stress which is caused by screwing and tightening the stud bolt 25f and which acts on the vicinity of the tapped hole in the upper crankcase 11U is reduced.

As described above, a piston 30 is fitted into each cylinder bore 12c of four cylinders of the cylinder block 12 integrally fastened to the upper crankcase 11U so that the piston 30 can be reciprocated. Each piston is coupled to the crankshaft 10 via a connecting rod 31.

In the cylinder head 13, for every cylinder bore 12c, a combustion chamber 32 is formed opposite to the piston 30. An intake port 33, which is open to the combustion chamber 32 and which is opened and closed by a pair of intake valves 35, extends rearward. An exhaust port 34, which is opened and closed by a pair of exhaust valves 36, extends forward. In addition, an ignition plug 37 is installed opposite to the combustion chamber 32. A throttle body 33a is coupled to an opening on the upstream side of the intake port 33, an intake pipe not shown is coupled on the upstream side of the throttle body, and an exhaust pipe is coupled to an opening on the downstream side of the exhaust port 34.

Each intake valve 35 and each exhaust valve 36 are opened and closed in synchronization with the rotation of the crankshaft 10 by means of an intake camshaft 38 and an exhaust camshaft 39 which are rotatably journaled by the cylinder head 13. Additionally, cam sprockets 38s, 39s are fitted to right ends of the camshaft 38, 39, a timing chain 40 is put between a drive sprocket 10s fitted in the vicinity of the right end of the crankshaft 10 and each cam sprocket 38s, 39s (see FIGS. 2 and 4), and the timing chain is driven at revolution speed equivalent to a half of the revolution speed of the crankshaft 10.

Figure 2:
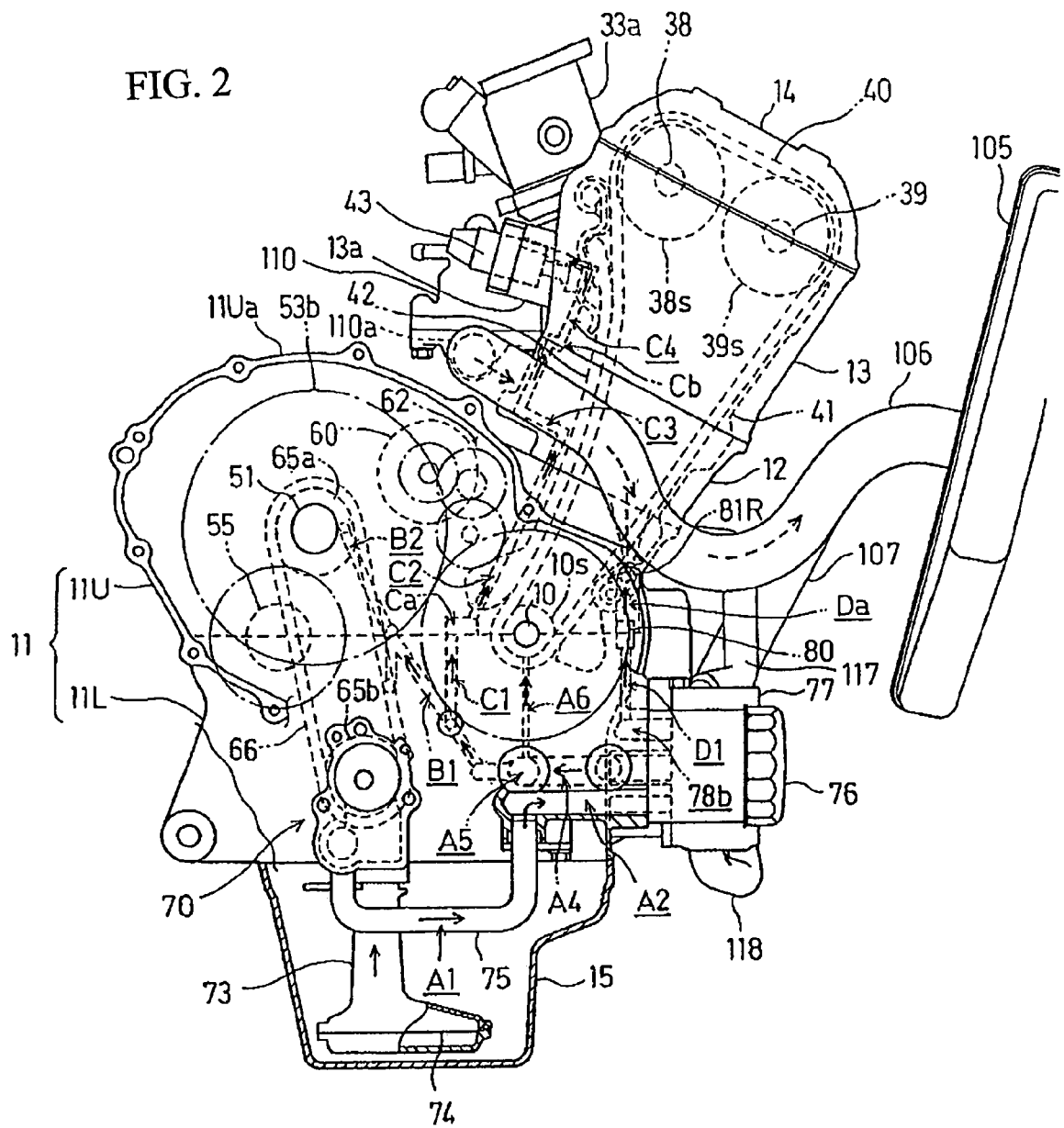
FIG. 2 is a right side sectional view of the internal combustion engine of FIG. 1, showing internal cooling oil passageways associated with the generator cooling oil delivery structure.

Cam chain chambers 12cc, 13cc for housing the timing chain 40 are formed at the right ends of the cylinder block 12 and the cylinder head 13 (see FIG. 4). Cam chain guides 41, 42 are provided in the cam chain chambers 12cc, 13cc along the front and rear sides of the timing chain 40, and the rear cam chain guide 42 is pressed against the timing chain 40 by a hydraulic type cam chain tensioner 43, so as to apply a suitable tension thereto (see FIG. 2). The cam chain tensioner 43 is attached to a tensioner fixing boss 13a which protrudes rearward from a rear face of the right end of the cylinder head 13 as shown in FIG. 2.

In the meantime, referring to FIG. 4, in the depicted embodiment, the left end of the crankshaft 10 protrudes outwardly toward the left from the left side wall of the crankcase 11, and an alternating current (AC) generator 47 is mounted on the engine E at the left end of the crankshaft. An outer rotor 47r of the AC generator 47 is fitted to the left end of the crankshaft 10, for concurrent rotation therewith during engine operation. An inner stator 47s is provided with a magneto coil of the AC generator 47. The stator 47s is supported by a generator cover 48, which covers the AC generator 47 from the left side, and is arranged inside of the outer rotor 47r, as shown.

A pulser coil 49, which functions as an engine speed sensor for detecting a number of revolutions of the crankshaft 10 during a predetermined time period, is arranged inside of the generator cover 48 near the outer periphery of the outer rotor 47r of the AC generator 47.

A transmission 50 is arranged at the rear of the crankshaft 10 in the crankcase 11. The transmission 50 is a constant-mesh type gear transmission, and includes a main shaft 51 journaled to the upper crankcase 11U via a bearing 52 so that the main shaft can be rotated on the diagonal upside at the rear of the crankshaft 10, and a countershaft 55 journaled via a bearing 56 so that the countershaft can be rotated with the countershaft held between the joined faces of the upper crankcase 11U and the lower crankcase 11L at the rear of the crankshaft 10. Opposite gears forming a pair in speed change gear groups 51g, 55g are mounted on the main shaft 51 and the countershaft 55, which are respectively parallel to the crankshaft 10, and opposite gears forming a pair are engaged. Each gear is fitted to the shaft via a spline, and speed is changed by the shift of gears by a shift mechanism functioning as a shifter.

A multiple disc friction clutch 54 is provided at the right end of the main shaft 51. A primary driven gear 53b is supported by a clutch outer 54o of the friction clutch 54 so that the primary driven gear is rotated together with the clutch outer, and a primary drive gear 53, formed in a crank web on the rightmost side of the crankshaft 10 is engaged with the primary driven gear 53b. A primary deceleration mechanism is thus configured.

A clutch inner 54i on the output side of the friction clutch 54 is fitted to the main shaft 51 via a spline connection, and therefore the rotation of the crankshaft 10 is transmitted to the main shaft 51 via the primary deceleration mechanisms 53a, 53b and the friction clutch 54. The rotation of the main shaft 51 is transmitted to the countershaft 55 via the engagement of the speed change gear groups 51g, 55g.

The countershaft 55 also function as an output shaft, and the left end of the countershaft 55 extends through the crankcase and protrudes outside thereof. An output sprocket 57 is fitted at the left end of the countershaft, and a transmission chain 58 joins the output sprocket 57 and a driven sprocket of a rear wheel not shown, whereby a secondary deceleration mechanism is configured. Motive power is transmitted to the rear wheel via the secondary deceleration mechanism.

As shown in FIG. 4, a driven gear for starting 63 is journaled via a one-way clutch 64 on the right side of the drive sprocket 10s on the crankshaft 10.

Figure 3:
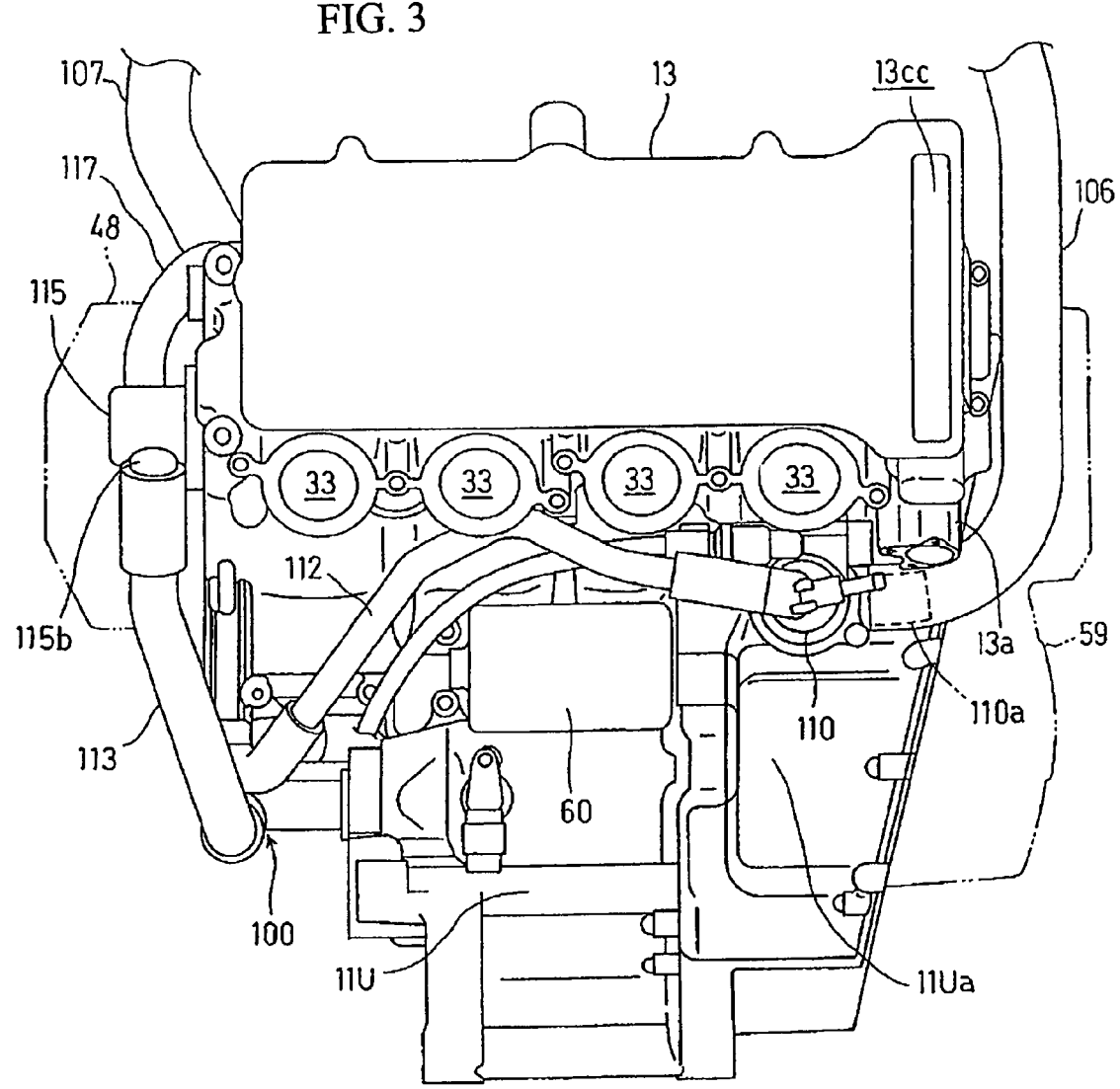
FIG. 3 is a top plan view of the internal combustion engine of FIGS. 1-2.

A starter motor 60 that starts the internal combustion engine E is attached to an upper face of the center of the crankcase 11 as shown in FIG. 3.

A right part of an upper wall of the upper crankcase 11U, at a location at the back of a part to which the cylinder block 12 is connected, greatly overhangs the friction clutch 54 and the primary driven gear 53b, thus protecting them from above. In addition, the starter motor 60 is attached along the left side of the overhanging part 11Ua. Moreover, the right side of the friction clutch 54 is covered with a clutch cover 59 (see FIG. 3).

A driving gear shaft 61, which protrudes on the right side of the starter motor 60, extends through a side wall of the overhanging part 11Ua of the upper crankcase 11U to its inside, and a speed reducing gear mechanism 62 is inserted between the driving gear shaft 61 and the driven gear 63 for starting. Therefore, the rotational speed of the driving gear shaft 61 by the drive of the starter motor 60 is reduced by the speed reducing gear mechanism 62, the rotational motion is transmitted to the driven gear 63 for starting, the rotational motion of the driven gear 63 for starting is transmitted to the crankcase 10 via the one-way clutch 64, and the internal combustion engine E is started.

As shown in FIG. 4, a drive sprocket 65a is rotatably journaled next to the left side of the primary driven gear 53b of the main shaft 51, an extended protrusion of the drive sprocket 65a is fitted into a hole of the primary driven gear 53b, and the drive sprocket is turned integrally with the primary driven gear 53b.

Figure 6:
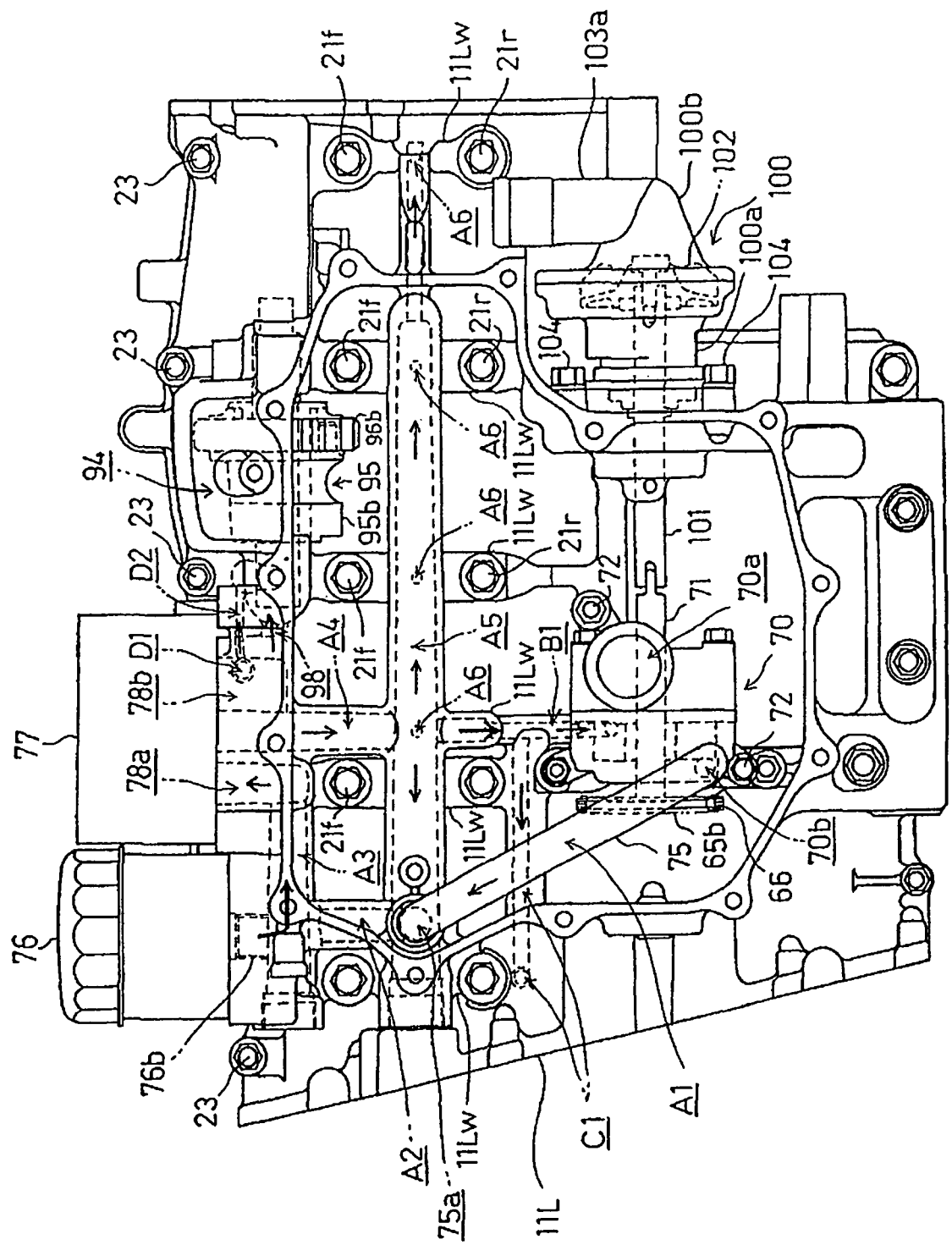
FIG. 6 is a bottom plan view of the crankcase of the internal combustion engine of FIGS. 1-5, with the oil pan removed from the drawing for illustrative purposes.

Referring to FIG. 6, which is a bottom view of the crankcase, it can be seen that an oil pump 70 and a water pump 100 are attached to the lower crankcase 11L so as to be laterally arranged below the main shaft 51.

The oil pump 70, located on the right side (on the left side in FIG. 6), is attached to the inside of the lower crankcase 11L by bolts 72 from below. The water pump 100, located on the left side (on the right side in FIG. 6), is attached to a left side wall of the lower crankcase 11L by bolts 104 by fitting it from the outside. In addition, a drive shaft 71, which protrudes from the left side of the oil pump 70, and a drive shaft 101, which protrudes from the right side of the water pump 100, are coaxially coupled. The drive shaft 71 of the oil pump 70 also protrudes to the right, and a driven sprocket 65b is fitted to its right end.

The drive sprocket 65a, provided on the main shaft 51, is located above the driven sprocket 65b, and an endless chain 66 extends between the drive sprocket 65a and the driven sprocket 65b (see FIG. 2). Therefore, the rotation of the crankshaft 10 is transmitted from the drive sprocket 65a, integrated with the primary driven gear 53b of the primary deceleration mechanism, to the driven sprocket 65b via the endless chain 66. Thus, the drive shaft 71 of the oil pump 70 and the drive shaft 101 of the water pump 100 are rotated together with the driven sprocket 65b.

Referring to FIG. 6, which shows the lower crankcase 11L as viewed from the underside, a balancer chamber 94 is formed between the front of the central journal wall 11Uw corresponding to the cylinder on the center side and the front of the journal wall 11Uw adjacent on the left side (on the right side in FIG. 6) of the above-mentioned journal wall. Both ends of a balance shaft 95a are supported by the right and left journal walls 11Uw, 11Uw in the balancer chamber 94, and a secondary balancer 95 is installed. The secondary balancer 95 is located in downward diagonal front of the crankshaft 10 in the side view shown in FIG. 1.

Figure 7:
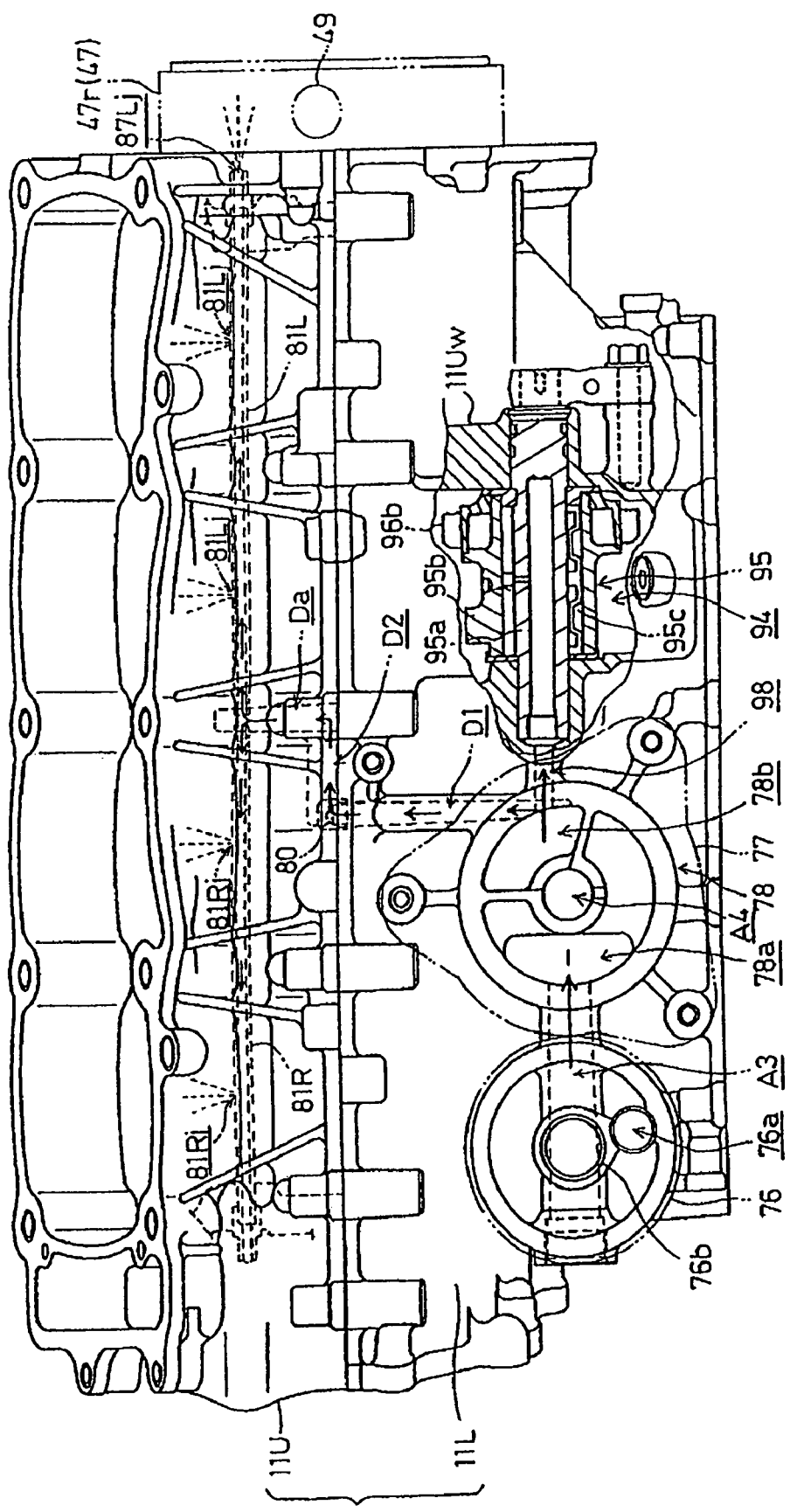
FIG. 7 is a front plan view of the crankcase of the internal combustion engine of FIGS. 1-6 shown with other parts removed from the drawing for illustrative purposes.

Referring to FIG. 7, which is a front view of the crankcase 11, with respect to the secondary balancer 95, balance weight 95b is journaled by the balance shaft 95a via a needle bearing 95c, and a balancer driven gear 96b is mounted on an outer periphery of a boss of the balance weight 95b.

The balancer driven gear 96b of the secondary balancer 95 is engaged with a balancer drive gear 96a (see FIG. 4), which has double the number of teeth of the balancer driven gear 96b formed in the crank web of the crankshaft 10. Therefore, the balance weight 95b of the secondary balancer 95 is turned at double the rotational speed of the crankshaft 10, and the secondary balancer absorbs secondary vibration of the in-line four-cylinder internal combustion engine 1.

The oil pump 70, which is a hydraulic supply source, is a trochoid pump. In the oil pump 70, an inner rotor integrated with the drive shaft 71 rotates an outer rotor engaged with the inner rotor in the vicinity of the inner rotor, and oil is taken and discharged depending upon the variation of volume between the rotors.

An inlet 70a of the oil pump 70 is open downward (see FIG. 6), a suction pipe 73 is coupled to the inlet 70a and extends downward into the oil pan 15, and an oil strainer 74 is arranged in a state in which the lower end is brought close to the bottom of the oil pan 15 (see FIG. 2). Therefore, when the oil pump 70 is driven, oil that accumulates in the oil pan 15 is led to the suction pipe 73 via the oil strainer 74 and is pumped up.

A discharge port 70b of the oil pump 70 is also open downward, as shown in FIGS. 2 and 6, and one end of an oil supply pipe 75 forming a first oil supply passage A1 is coupled to the discharge port 70b. The oil supply pipe 75 extends on the diagonal right side in front (on the left side in FIG. 6), detouring downwardly, across toward the front, and then upwardly in the oil pan 15. The outlet end of the oil supply pipe 75 is coupled to an inlet 75a open on the downside of the end of a second oil supply passage A2 bored rearward from an inflow port 76a (see FIG. 7) of an oil filter 76, the oil filter 76 protruding in the vicinity of the right end of the front of the lower crankcase 11L.

Referring to FIGS. 6 and 7, an oil cooler 77 resides on the left side (on the right side in FIGS. 6, 7) of the oil filter 76, and is arranged in the vicinity of the right end in the front of the lower crankcase 11L, protruding forwardly therefrom. An oil cooler housing 78, including an inflow port 78a and an outflow port 78b of the oil cooler 77, is formed in a part to which the oil cooler 77 is attached in the front of the lower crankcase 11L. The balancer 95 is arranged adjacent to the left side of the oil cooler housing 78 (see FIG. 6).

As shown in FIG. 6, an outflow cylinder 76b, protruding from a rear face of the oil filter 76, communicates with a third oil supply passage A3. The third oil supply passage A3 is a laterally extending bore that communicates with the inflow port 78a of the oil cooler housing 78.

A fourth oil supply passage A4 is a bore which extends rearward from the outflow port 78b in the center of the oil cooler housing 78 (see FIGS. 6 and 7).

A main gallery A5, which is a fifth oil supply passage, is a bore that extends in parallel with the crankshaft 10 and below the crankshaft 10 so that the main gallery is perpendicular to the fourth oil supply passage A4. The main gallery A5 pierces the five journal walls 11Lw of the lower crankcase 11L, and an oil branch supply passage A6 is provided in each journal wall 11Lw comprising a bore that extends toward each journal bearing.

Referring to FIG. 2, an oil supply passage B1 for supplying oil to the side of the transmission 50 comprises a bore extending diagonally upward toward the rear from the rear end of the oil supply passage A4. In addition, an oil supply passage B2 for supplying oil to a bearing of the main shaft 51 in the upper crankcase 11U comprises a bore which is in fluid communication with the oil supply passage B1.

Referring to FIGS. 2 and 6, a first tensioner oil supply passage C1, for supplying oil to the cam chain tensioner 43, is also bored in the lower crankcase 11L, flowing rightward from the oil supply passage B1. The first tensioner oil supply passage C1 branches reaches the rightmost journal wall 11Lw, is bent upward from its right end, and is open to the joined faces of the upper 11U and lower 11L portions of the crankcase 11.

A recessed portion of suitable volume is formed on the joined face of the rightmost journal wall 11Uw of the upper crankcase 11U opposite to an opening of the first tensioner oil supply passage C1. The recessed portion functions as an oil reservoir Ca because an opening of the recessed portion is bounded by the joined face of the journal wall 11Lw of the lower crankcase 11L except the opening of the first tensioner oil supply passage C1.

A second tensioner oil supply passage C2 is bored from the oil reservoir Ca diagonally upward and forward toward the cylinder block 12 along the joined face of the journal wall 11Uw in the upper crankcase 11U. The second tensioner oil supply passage C2 is connected to a third tensioner oil supply passage C3 bored in the rear of the right side wall of the cylinder block 12.

The third tensioner oil supply passage C3 in the cylinder block 12 is bent once rearward and is bent again after the third oil supply passage is bored in an axial direction of the cylinder from the face joined to the upper crankcase 11U, and communicates with a fourth tensioner oil supply passage C4 bored in the cylinder head 13 through labyrinth structure Cb formed on the face joined to the cylinder head 13. The fourth tensioner oil supply passage C4 is bent in L-shape, is connected to an inflow port of the cam chain tensioner 43, and supplies oil to the cam chain tensioner 43. The labyrinth structure Cb on the way means a labyrinth on the joined face between the cylinder block 12 and the cylinder head 13 and has effect as a filter.

In the meantime, referring to FIGS. 2 and 7, a first piston oil supply passage D1 for supplying oil for cooling each piston extends upward from the outflow port 78b of the oil cooler housing 78. The outflow port 78b resides in the lower crankcase 11L, and the first piston oil supply passage D1 is a bored-out passage which extends upward to the face which joins the upper 11U and lower 11L portions of the crankcase 11. A communicating hole 98 is also formed within the outflow port 78b of the oil cooler housing 78 that extends toward the balance shaft 95a of the balancer 95. The balancer 95 lies adjacent to, and on the left side of the oil cooler 77, and the communicating hole 98 supplies oil for lubricating the balancer 95 (see FIGS. 6 and 7).

The cavity 28, formed in the central journal wall 11Uw out of the five journal walls 11Uw of the upper crankcase 11U, is open to the joined face of the case portions 11U, 11L. A groove for a second piston oil supply passage D2 is formed up to a part where an opening of the cavity 28 in the center of the joined face of the upper crankcase 11U and the first piston oil supply passage D1 are opposite (see FIG. 7). That is, the second piston oil supply passage D2 is formed so that a part of an opening of the groove formed in the upper crankcase 11U is bounded by the joined face of the lower crankcase 11L.

A filter 80 having plural small holes is installed at a connection of the joined face of the case portions 11U, 11L and the second piston oil supply passage D2 at an upper end of the first piston oil supply passage D1. The filter 80 is formed by mechanical working or press working.

The cavity 28, with which the second piston oil supply passage D2 communicates and which is formed in the central journal wall 11Uw of the upper crankcase 11U, is bounded by with the joined face of the lower crankcase 11L to be an oil reservoir Da that has suitable volume and can temporarily reserve oil though the oil reservoir is also a third oil supply passage. As described above, since the oil reservoir Da is formed with the oil reservoir open to the joined face of the upper crankcase 11U, the oil reservoir Da can be simultaneously formed in casting the upper crankcase 11U and no additional mechanical working is required in the formation of the oil reservoir DA. In addition, since the oil reservoir Da is formed because a part of the opening of the oil reservoir Da is closed by the joined face of the lower crankcase 11L, no dedicated cover member is separately required and the number of parts can be reduced.

As described above, referring again to FIG. 5, since the tapped hole 26f is formed to extend to the oil reservoir Da, from the face where the cylinder head 13 is joined to the cylinder block 12, the stud bolt 25f that extends through the cylinder head 13 and the cylinder block 12 is screwed into the tapped hole 26f and a part of the end protrudes into the oil reservoir Da, the concentration in a part of stress that acts on the vicinity of the tapped hole of the upper crankcase 11U by screwing and tightening the stud bolt 25f can be reduced. Because this stress concentration reducing structure is formed utilizing the oil reservoir Da for stably supplying oil to oil jets 81Lj, 81Rj, 87Lj described later, no dedicated structure is separately required and working for the structure is also not required.

Figure 8:
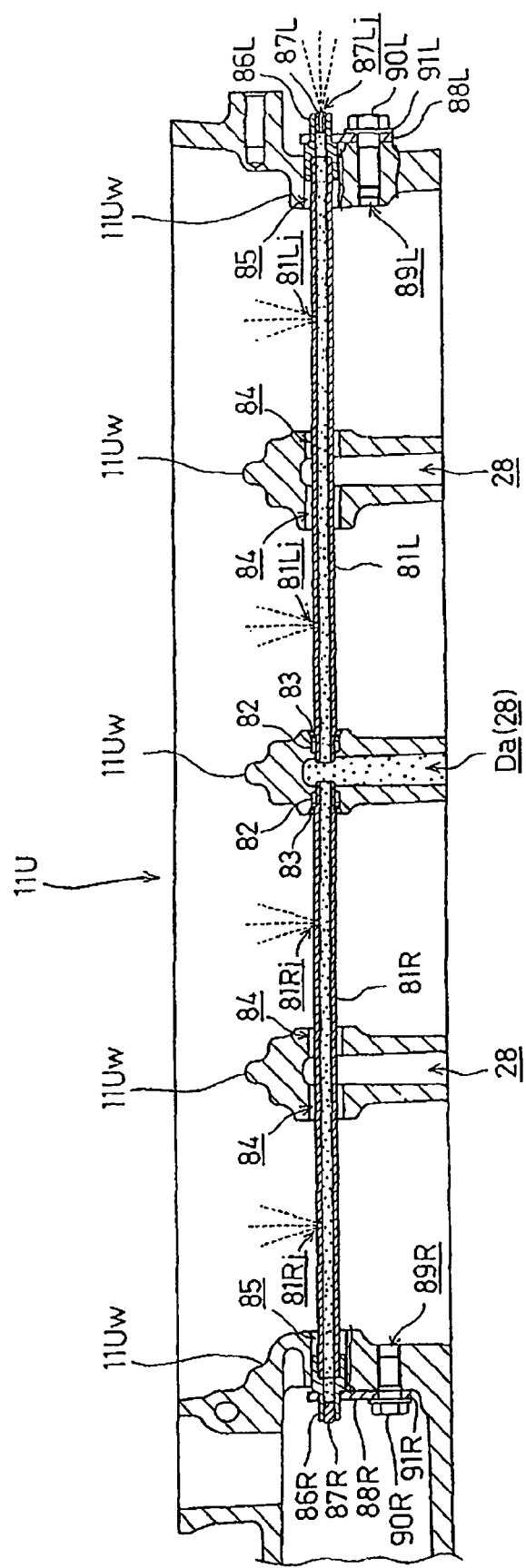
FIG. 8 is a sectional detail view of an upper crankcase portion of the internal combustion engine of FIGS. 1-7.

Referring to FIG. 8, inner ends of left and right oil jet pipes 81L, 81R for cooling each piston are linear pipe members that are fitted from both left and right sides of the oil reservoir Da. Left and right oil jet pipes extend in space on the upper side of the oil reservoir Da and the pipes extend laterally outside (note that in FIG. 8, the left and the right are reverse).

The piston cooling oil jets 81Lj, 81Rj consist of oil jet holes that are bored on the left and right oil jet pipes 81L, 81R, such that two jet holes are provided on each of the right and left sides of the oil reservoir Da. The piston cooling oil jets 81Lj, 81R direct oil-toward an upper side of each respective cylinder bore 12c, and are located at a position intermediate each of the five adjacent journal walls 11Uw.

Circular holes are coaxially formed in a predetermined position on the right and left side walls forming the oil reservoir Da, the inner ends of the left and right oil jet pipes 81L, 81R are fitted into the circular holes via collars 82, 82 and O-rings 83, 83, and an oil inlet which is an opening of the inner end is placed adjacent to the oil reservoir Da for each of the oil jet pipes. The left and right oil jet pipes 81L, 81R pierce circular holes 84, 84 of both left and right journal walls 11Uw, 11Uw adjacent to the central journal wall 11Uw and their outer ends are inserted into circular holes 85, 85 formed in left and right outermost journal walls 11Uw, 11Uw.

The outer ends of the left and right oil jet pipes 81L, 81R are covered with cylindrical nozzle cap members 86L, 86R. The nozzle cap members 86L, 86R are formed to have a reduced diameter at an outer end thereof. That is, the nozzle cap members 86L, 86R are axially non-uniform such that the inside and outside diameter at an inner end is greater than the inside diameters and outside diameters at the outer end thereof. The oil jet pipes 81L, 81R are covered with the nozzle cap members 86L, 86R by press-fitting the oil jet pipes 81L, 81R into the parts having the larger inside diameters, which are substantially equal to, or slightly smaller than the outside diameters of the oil jet pipes 81L, 81R, to create an interference fit therebetween.

Portions of the nozzle cap members 86L, 86R having the larger outer diameters are press-fitted into the circular holes 85, 85 formed in the left and right outermost journal walls 11Uw, 11Uw, and the outer ends of the oil jet pipes 81L, 81R are fastened to and supported by the left and right outermost journal walls 11Uw, 11Uw via the nozzle cap members 86L, 86R. As seen in FIG. 8, a portion of the nozzle cap members 86L, 86R corresponding to the part having the larger outside diameters, as well as the parts having smaller outside diameter protrude outside the left and right outermost journal walls 11Uw, 11Uw, respectively.

At one end of the oil jet pipes 81R, 81L, for example the left end, a cylindrical oil jet aperture fitting member 87L is press-fitted, as an oil jet hole, into an outside opening of the smaller inside diameter part of the left nozzle cap member 86L. A nozzle outlet tube 87Lj, for dispensing a spray of oil to cool the generator, is formed at an end of the cylindrical oil jet member 87L.

In contrast, on the opposed end of the oil jet pipes, for example the right end, a plug member 87R is press-fitted into an outside opening of the smaller inside diameter part of the right nozzle cap member 86R, to close the opening thereof, and thereby block oil from exiting via the right nozzle cap member.

The nozzle cap members 86L, 86R are supported on the left and right outermost journal walls 11Uw, 11Uw using support stays 88L, 88R. Circular holes at the ends of the plate fitting stays 88L, 88R are press-fitted into the tips of the nozzle cap members having the smaller outside diameters, and these tip portions are protruded outside of the main body portions of the respective nozzle cap members 86L, 86R. Clamping bolts 90L, 90R are screwed and tightened via washers 91L, 91R from the outside after circular holes 88La, 88Ra at bases of the fitting stays 88L, 88R are aligned with tapped holes 89L, 89R formed in each predetermined position of the left and right outermost journal walls 11Uw, 11Uw.

As for a method of mounting the left oil jet pipe 81L, first, the fitting stay 88L is integrally fastened to the outer end of the oil jet pipe 81L via the nozzle cap member 86L beforehand with predetermined relative positional relation maintained.

Figure 9:
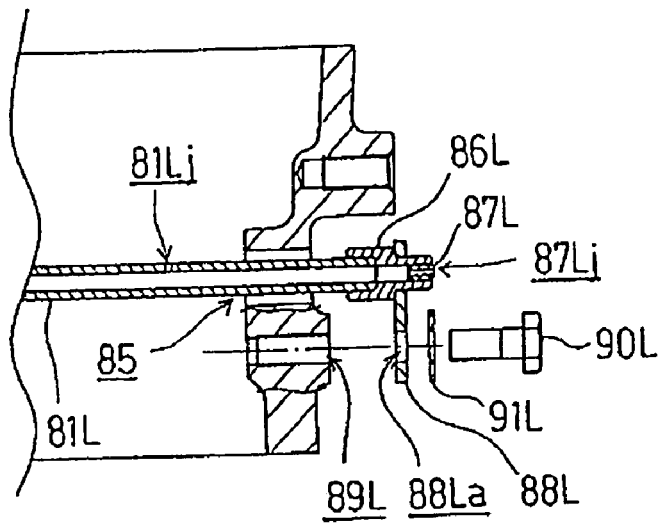
FIG. 9 is an exploded sectional detail view, partially cut away, of the left end portion of the upper crankcase shown in FIG. 8, illustrating the arrangement structure of the oil jet pipe.
Figure 10:
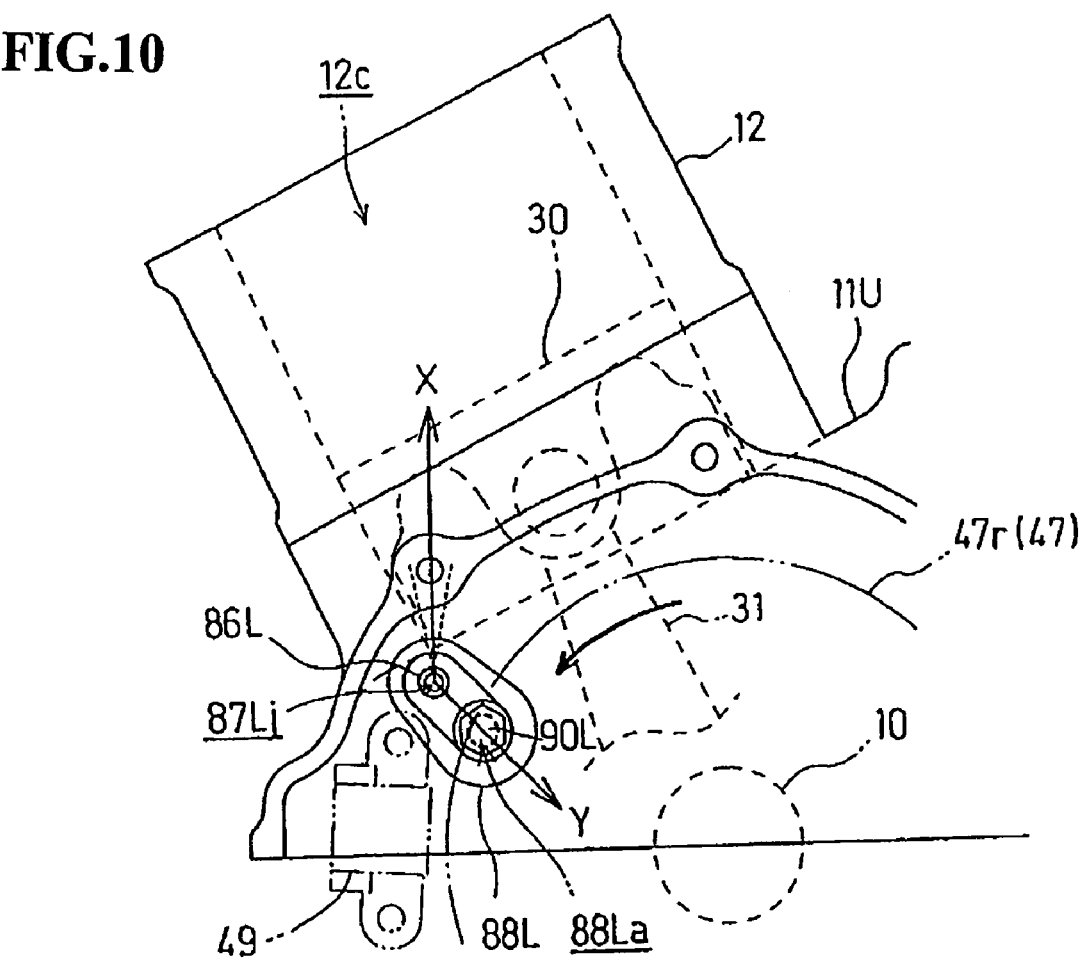
FIG. 10 is a side plan detail view of a portion of the upper crankcase of FIG. 8, in which a part of the upper crankcase is omitted, and the arrangement structure of the oil jet pipe is shown.

That is, as shown in FIGS. 9-10, the oil jet pipe 81L and the fitting stay 88L are integrally fastened so that a direction X, in which the oil jet 81Lj for cooling each piston bored on the oil jet pipe 81L exists, and a direction Y, in which the circular hole 88La at the base of the fitting stay 88L exists, form a predetermined relative angle based upon (with respect to) a central axis of the oil jet pipe 81L.

At the same time, when the oil jet pipe 81L, to which the fitting stay 88L is integrally fastened via the nozzle cap member 86L as described above, is inserted into the circular hole 85 of the left outermost journal wall 11Uw from its inner end and extends through the journal wall (see FIG. 9), further extends through the circular hole 84 of the journal wall 11Uw on the way, and is fitted into the circular hole of the central journal wall 11Uw via the collar 82 and the O-ring 83, the nozzle cap member 86L is press-fitted into the circular hole 85.

In press-fitting, when the circular hole 88La at the base of the fitting stay 88L is matched (aligned) with the tapped hole 89L formed in a predetermined position of the left outermost journal wall 11Uw, turning the fitting stay 88L integrally with the oil jet pipe 81L, the oil jet 81Lj for cooling each piston bored on the oil jet pipe 81L can be easily set to a direction which is substantially vertically upward, as shown in FIG. 10, and in which oil is efficiently jetted to each piston 30 in its respective cylinder bore 12c.

The oil jet 81Lj for cooling each piston can be fixed in an optimum direction by making the clamping bolt 90L pierce the circular hole 88La at the base via the washer 91L, by screwing and tightening the clamping bolt into the tapped hole 89L after the above-mentioned setting.

Since the other right fitting structure of the oil jet pipe 81R is substantially similar to the oil jet pipe 81L, the oil jet 81Rj for cooling each piston can be fixed in an optimum direction by the similar method. However, the right fitting stay 88R is a little larger than the left fitting stay 88L, and has a little longer distance between the circular hole at the end and the circular hole at the base. Therefore, since the tapped hole formed in the predetermined position of the journal wall 11Uw and the circular hole at the base of the fitting stay are not matched (do no align) when the right oil jet pipe and the left oil jet pipe are switched and the clamping bolt cannot be screwed, it is immediately known that the right one and the left one are mistakenly interchanged and wrong mounting can thereby be prevented.

The left and right oil jet pipes 81L, 81R that extend through the five journal walls 11Uw of the upper crankcase 11U and are fitted to the journal walls as described above enable the effectively jetting of oil to the piston 30 in each respective cylinder bore 12c by providing oil to each corresponding oil jet 81Lj, 81Rj, whereby each piston 30 is efficiently cooled.

The oil jet member 87L is press-fitted to the left end of the left pipe 81L for jetting oil and oil is jetted leftward from the nozzle outlet tube 87lj for cooling the generator of the oil jet member 87L.

The nozzle outlet tube 87lj for cooling the generator does not jet oil directly to the AC generator 47, but rather, jets oil toward an annular space formed between the peripheral surface of the outer rotor 47r of the AC generator 47 and the inner surface of the generator cover 48, in order to cool the AC generator 47.

As shown in FIG. 10, when the nozzle outlet tube 87lj for cooling the generator is viewed in an axial direction of the crankshaft, that is, in a left end view thereof, the nozzle outlet tube 87lj for cooling the generator is positioned inside the generator cover 48 and is located above the pulser coil 49, close to the front of the outer rotor 47r. That is, in a left end view of the crankshaft, the nozzle outlet tube 87lj is positioned above the crankshaft and diagonally forward thereof, and is positioned in front of and in the vicinity of the outer periphery of the outer rotor 47r of the AC generator 47.

In the front view shown in FIG. 7, the nozzle outlet tube 87lj for cooling the generator is located on the right side (on the left side in FIG. 7) of the outer rotor 47r, and of the pulser coil 49 which overlaps the outer rotor 47r in this view. Therefore, since oil is jetted to space around the outer rotor 47r from the nozzle outlet tube 87lj for cooling the generator, the oil is diffused. However, the space in which the oil is diffused is the annular space between the peripheral surface of the outer rotor 47r of the AC generator 47 and the inner surface of the generator cover 48, and is substantially limited to space above the pulser coil 49 and on the diagonal upside in front of the outer rotor 47r. The oil diffused space is a part of the space provided for housing the pulser coil 49.

Since the outer rotor 47r of the AC generator 47 is turned counterclockwise, as shown by an arrow in a left side view shown in FIG. 10, since the pulser coil 49 is located next to the oil jetted area on the downstream side in a rotational direction of the oil jetted area from the nozzle outlet tube 87lj, and since oil is diffused in substantially limited small space, in contrast to the conventional arrangement for the diffusion of oil in a large space described above, the oil diffused space is filled with atomized oil.

The outer rotor 47r is turned while exposing its peripheral surface to the space which is fitted with oil and in which the oil is diffused. As a result, the oil is uniformly sprayed to the entire peripheral surface of the outer rotor 47r, and the outer rotor 47r can be uniformly and efficiently cooled.

Oil jetted from the nozzle outlet tube 87lj hits the bottom (the inner surface to which the nozzle outlet tube 87lj for cooling the generator is opposite) of the bowl-like generator cover 48, and when the oil is passed along the bottom and is supplied to the inner stator 47s of the AC generator 47, the inner stator 47s is cooled. In this regard, a rib (not shown) is formed which extends from a location in the vicinity opposite to the nozzle outlet tube 87lj for cooling the generator toward a stator boss at the bottom of the generator cover 48, and oil is guided to the inner stator 47s by this rib.

As described above, oil is supplied to both the outer rotor 47r and the inner stator 47s of the AC generator 47 and the AC generator 47 can be efficiently cooled.

Since the nozzle outlet tube 87lj for cooling the generator does not jet oil directly to the outer rotor 47r but jets oil toward the space in the vicinity thereof, and the oil is diffused in the space, friction to the turning of the outer rotor 47r is never increased.

The oil diffused space in which oil is jetted from the nozzle outlet tube 87lj for cooling the generator and in which oil is diffused utilizes a part of space provided to arrange the pulser coil 49. As a result, the internal combustion engine is prevented from being enlarged by separately providing spaces.

As described above, the oil jet pipe 81L provided for cooling each piston is also utilized as a means for supplying oil to the nozzle outlet tube 87lj for cooling the AC generator 47. As a result, a dedicated oil passage for cooling the AC generator 47 is not required to be newly formed, the engine structure is simplified, processing man-hours and the number of parts thereof are reduced, and the cost is reduced.

Since the paths of oil supply are configured as described above, oil discharged from the discharge port 70b when the oil pump 70 is driven flows into the oil filter 76 from the second oil supply passage A2 through the first oil supply passage A1 (the oil supply pipe 75), impurities such as dust are removed there, the oil flows into the third oil supply passage A3, flows into the oil cooler 77 through the inflow port 78a and is cooled there, the oil flows from the outflow port 78b into the fourth oil supply passage A4, reaches the main gallery A5, flows from the main gallery A5 to the crankshaft 10 and into the oil supply passages B1, B2 through the oil branch supply passage A5, and the oil is supplied to hydraulic equipment such as the cam chain tensioner 43 through each part to be lubricated such as the transmission 50 and the oil supply passages C1, C2, C3, C4.

In the meantime, oil divided from the outflow port 78b of the oil cooler 77 into a first oil supply passage D1 reaches the oil reservoir Da from a second oil supply passage D2 via a filter 80 on the joined faces of the upper crankcase 11U and the lower crankcase 11L, is distributed from the oil reservoir Da to the left and right pipes 81L, 81R for jetting oil, is jetted from the oil jets 81Lj, 81Rj for cooling each piston and the nozzle outlet tube 87lj for cooling the generator of the pipes 81L, 81R for jetting oil, each piston 30 is cooled by the oil jetted from the oil jets 81Lj, 81Rj for cooling each piston, and the AC generator 47 is cooled by the oil jetted from the nozzle outlet tube 87lj for cooling the generator.

Since the oil reservoir Da is provided on the upstream side on which oil is distributed to the left and right oil jet pipes 81L, 81R, the pulsation of the oil discharge pressure of the oil pump 70 is attenuated, oil is distributed to the oil jet pipes 81L, 81R, is stably supplied to the oil jets 81Lj, 81Rj for cooling each piston and the nozzle outlet tube 87lj for cooling the generator, is stably jetted from the oil jets 81Lj, 81Rj for cooling each piston and the nozzle outlet tube 87lj for cooling the generator, and each piston 30 and the AC generator 47 are more efficiently cooled.

In addition, as described above, the tapped hole 26f is formed to extend from the joined face of the cylinder block 12 to the cylinder head 13 to the oil reservoir Da, the stud bolt 25f that extends through the cylinder head 13 and the cylinder block 12 is screwed into the tapped hole 26f, and the end protrudes into the oil reservoir Da. As a result, the concentration in a part of stress that acts on the vicinity of the tapped hole of the upper crankcase 11U by screwing and tightening the stud bolt 25f is reduced. Because the stress concentration reducing structure is configured utilizing the oil reservoir Da for stably supplying oil to the oil jets 81Lj, 81Rj, 87Lj, a separate, dedicated structure is not required, and the corresponding work for achieving the dedicated structure is not required.

Since the oil reservoir Da utilizes the cavity 28 of the central journal wall 11Uw, oil is uniformly distributed to the left and right oil jet pipes 81L, 81R, is uniformly supplied to the four oil jets 81Lj, 81Rj for cooling each piston 30, and is efficiently jetted from them. Since the oil jets 81Lj, 81Rj for cooling each piston are formed on the left and right oil jet pipes 81L, 81R, plural oil jets 81Lj, 81Rj for cooling each piston can be concentrated on the oil jet pipes 81L, 81R as a tube-like member, compared with a case that an oil jet is attached to each journal wall of the crankcase. Therefore, the internal combustion engine employing the oil jet pipes 81L, 81R is excellent in terms of ease of assembly.

In this embodiment, the two oil jet pipes 81L, 81R extend sideways, one pipe extending from each side of the oil reservoir Da. However, an alternative embodiment may be provided in which only a single oil jet pipe is used which extends through the oil reservoir Da and to both sides of the oil reservoir Da, the single oil jet pipe including an inlet open to the oil reservoir.

In this water-cooled internal combustion engine E, a cooling system is provided in which the drive shaft 71 and the drive shaft 101 are coupled and cooling water is supplied by the water pump 100 driven in interlock with the oil pump 70, and is configured as a supply source for cooling water.

In the cooling system of this internal combustion engine E, referring to FIG. 1, the water pump 100 is attached to the rear of the left side wall of the lower crankcase 11L as described above, a radiator 105 is arranged in front of the internal combustion engine E, and a thermostat 110 is coupled to an outflow pipe 108 which extends rearward from the underside of the intake port 33 of the cylinder at the right end of the cylinder head 13.

The other end of a radiator inflow hose 106, one end of which is connected to a connecting pipe 110a protruded on the right side of the thermostat 110, is connected to an inflow port of the radiator 105 detouring forward on the right side of the cylinder block 12 as shown in FIGS. 2 and 3. The connecting pipe 110a protrudes in space between the cam chain tensioner 43 and the overhanging part 11Ua of the upper crankcase 11U as shown in FIG. 2, the radiator inflow hose 106 passes the space, and extends rightward.

The water pump 100 is configured by a pump body 100a in which a pump house for housing an impeller 102. The impeller 102 turns integrally with the drive shaft 101, and the drive shaft 101 is journaled on the pump house. One end of a radiator outflow hose 107 is connected to a connecting pipe 103a which extends in front of a suction port of the pump cover 100b. A pump cover 100b (see FIG. 6) and the other end of the radiator outflow hose 107 is connected to an outflow port of the radiator 105 arranged along a lower part of the left side of the lower crankcase 11L.

One end of a bypass hose 112 is connected to the connecting pipe 103b which extends on the upside of the same suction port of the pump cover 10b. The bypass hose 112 extends upward along each rear of the left sides of the lower crankcase 11L and the upper crankcase 11U as shown in FIGS. 1 and 3, is bent on the diagonal right side forward on a top face of the upper crankcase 11U, passes the left side of the starter motor 60, extends rightward and diagonally upward between the starter motor 60 and the cylinder block 12 or the cylinder head 13 as shown in the plan in FIG. 3, and the other end is connected to a bypass outflow port on the upside of the thermostat 110.

Further, one end of a pump discharge hose 113 is connected to a connecting pipe 103c extending from a discharge port of the pump cover 100b of the water pump 100. The pump discharge hose 113 extends upward along each rear of the left sides of the lower crankcase 11L and the upper crankcase 11U, is bent forward, and the other end is connected to an inflow connecting pipe 115b extended at the diagonal back of a joint member 115 which protrudes from the left side of the cylinder block 12.

The joint member 115 has an internal space 115a open to a joined face to the cylinder block 12 and longer in height, and a flange part at the edge of an opening is fastened to the cylinder block 12 by bolts 116 in three locations (see FIGS. 1 and 4).

As shown in FIG. 4, a lower inflow port 120 and an upper inflow port 121 respectively vertically partitioned are formed opposite to the opening of the internal space 115a of the joint member 115 on the left side wall of the cylinder block 12. The lower inflow port 120 communicates with a first water jacket 12w formed around the cylinder bore 12c of the cylinder block 12, a communicating hole 122 bent upward ranges to a communicating hole 123 of the cylinder head 13 from the upper inflow port 121, and the communicating hole 123 communicates with a second water jacket 13w of the cylinder head 13.

As shown in FIG. 1, a branch connecting pipe 115c extends diagonally forward from the joint member 115, and an inflow hose 117 for the oil cooler, one end of which is connected to the branch connecting pipe 115c, extends diagonally forward and downward. The other end of the inflow hose 117 is connected to a water inflow port of the oil cooler 77 which protrudes from the front of the lower crankcase 11U. An outflow hose 118 extends from a water outflow port of the oil cooler 77, and is coupled to the radiator outflow hole 107. The outflow hose 118 returns cooling water via the oil cooler 77 to the water pump 100 utilizing a part of the radiator outflow hose 107.

In the cooling system of the internal combustion engine E configured as described above, cooling water discharged by the drive of the water pump 100 reaches the joint member 115 of the cylinder block 12 through the pump discharge hose 113, the lower inflow port 120 and the upper inflow port 121 respectively on the left side wall of the cylinder block 12 branch from the joint member 115 of the cylinder block 12, cooling water that flows into the lower inflow port 120 flows rightward in the first water jacket 12w of the cylinder block 12 and cools the cylinder block 12, cooling water that flows into the upper inflow port 121 flows rightward in the second water jacket 13w of the cylinder head 13 through the communicating holes 122, 123 and cools the cylinder head 13.

A gasket (not shown) held between the joined faces of the cylinder block 12 and the cylinder head 13 partitions the first water jacket 12w of the cylinder block 12 and the second water jacket 13w of the cylinder head 13. However, a communicating hole is bored in a part of the right end, cooling water that cools the cylinder block 12 flows from the first water jacket 12w into the second water jacket 13w, cooling water that flows independently in the first water jacket 12w and in the second water jacket 13w meet, the cooling water flows out of the outflow pipe 108 which extends rearward at the right end of the rear of the cylinder head 13, and reaches the thermostat 110.

The thermostat 110 controls the circulation and the cutoff of cooling water to the radiator 105 according to the warming up of the internal combustion engine E.

During engine warm up, the warming up process is accelerated by making cooling water that passes the cylinder block 12 and the cylinder head 13 flow into the bypass hose 112 without passing through the radiator 105, and returning it to the water pump 100. In normal operation after the engine is warmed up, the cooling water is made to flow into the radiator 105 by switching to the flow into the radiator inflow hose 106, the temperature of the cooling water is lowered by circulating the cooling water in the radiator, and the cooling of the cylinder block 12 and the cylinder head 13 is accelerated.

In the meantime, cooling water discharged into the pump discharge hose 113 from the water pump 100 is divided into the lower inflow port 120 and the upper inflow port 121 of the cylinder block 12 via the joint member 115, and the cooling water is circulated so as to cool oil so that the cooling water is also divided into the inflow hose 117 in the internal space 115a of the joint member 115, reaches the oil cooler 77 and returns to the water pump 100 via a part of the radiator outflow hose 107 through the outflow hose 118 from the oil cooler 77.

As described above, oil cooled by the oil cooler 77 is divided from the outflow port 78b of the oil cooler housing 78 into the first oil supply passage D1, is distributed to the left and right pipes 81L, 81R for jetting oil through the second oil supply passage D2 and the oil reservoir Da, is jetted to each piston 30 from the oil jets 81Lj, 81Rj for cooling each piston to cool each piston 30, and is jetted from the nozzle outlet tube 87lj for cooling the generator to cool the AC generator 47.

Since oil for cooling is divided at the outflow port 78b on the immediate downstream side of the oil cooler 77 and is supplied to parts to be cooled of each piston 30 and the AC generator 47, the parts to be cooled can be cooled by oil kept at low temperature.

While a working example of the present invention has been described above, the present invention is not limited to the working example described above, but various design alterations may be carried out without departing from the present invention as set forth in the claims.

What is claimed is:

1. A cooling oil delivery structure for cooling a vehicular generator mounted on an engine,
    the engine comprising:
        a crankcase;
        a crankshaft rotatably mounted in the crankcase, the generator disposed at one end of the crankshaft; and
        a piston,
    the cooling oil delivery structure comprising:
    a piston cooling oil passage formed in the crankcase and arranged on an axis parallel to the crankshaft, the piston cooling oil passage having a piston cooling oil jet formed medially therein for jetting oil to the piston; and
a generator cooling oil jet that cools the generator by jetting oil onto the generator, the generator cooling oil jet provided on the crankcase at an end of, and in fluid communication with the piston cooling oil passage.

2. The cooling oil delivery structure for the vehicular generator according to claim 1, further comprising:
an engine speed sensor that detects engine speed by sensing a number of rotations of the crankshaft during a time period, the engine speed sensor arranged adjacent a target space toward which oil is jetted from the generator cooling oil jet, wherein said target space is proximate the generator.

3. The cooling oil delivery structure for the vehicular generator according to claim 1,
wherein the generator cooling oil jet is located outside the generator when the oil jet is viewed in a direction viewing an end of the crankshaft, and
wherein the generator cooling oil jet jets oil in a direction substantially parallel to the crankshaft.

4. The cooling oil delivery structure for the vehicular generator according to claim 1, wherein the generator cooling oil jet comprises a nozzle cap member disposed on the end of the piston cooling oil passage, the nozzle cap member surrounding a terminal end portion of the piston cooling oil passage.

5. The cooling oil delivery structure for the vehicular generator according to claim 4, wherein the nozzle cap member has an inner end and an outer end, the inner end surrounding the terminal end portion of the piston cooling oil passage, and the outer end comprising a reduced-diameter portion having a diameter which is smaller than a diameter of the inner end.

6. The cooling oil delivery structure for the vehicular generator according to claim 4, wherein the nozzle cap member is press fit into an opening formed in the crankcase.

7. The cooling oil delivery structure for the vehicular generator according to claim 1, wherein
the engine comprises a plurality of pistons, and
the crankcase comprises:
plural journal walls for supporting the crankshaft; and
a cooling oil reservoir formed in a central journal wall of the plural journal walls,
wherein the piston cooling oil passage comprises a pipe extending laterally from the cooling oil reservoir, the pipe comprising:
a first end open to the oil reservoir;
a second end open to an exterior of an outer journal wall of the plural journal walls;
an intermediate portion disposed between the first and second ends;
the piston cooling oil jet comprising an opening formed in a sidewall of the pipe in the intermediate portion; and
wherein the generator cooling oil jet is disposed on the second end.

8. The cooling oil delivery structure for the vehicular generator according to claim 7, wherein the cooling oil reservoir comprises a hollow space formed in a central journal wall of plural journal walls provided in an interior of the crankcase.

9. The cooling oil delivery structure for the vehicular generator according to claim 7, wherein
said one end of the crankshaft extends through the outer journal wall at a location below the second end of the pipe,
the generator is disposed on said one end of the crankshaft adjacent the outer journal wall, and is covered by a generator cover,
the generator cooling oil jet is disposed between an outer periphery of the generator and the cover at a location above and diagonally forward of the crankshaft, wherein during engine operation, the generator cooling oil jet jets oil into an enclosed space defined between the generator and generator cover.

10. The cooling oil delivery structure for the vehicular generator according to claim 9, wherein the engine further comprises an engine speed sensor, the engine speed sensor disposed in the vicinity of said one end of the crankshaft so as to be covered by the generator cover, and wherein the generator cooling oil jet is located above said engine speed sensor.

11. The cooling oil delivery structure for the vehicular generator according to claim 7, wherein
the piston cooling oil passage further comprises a second pipe extending laterally from the cooling oil reservoir, the second pipe comprising:
a first end open to the cooling oil reservoir;
a second end located at an exterior side of a second outer journal wall of the plural journal walls; and
an intermediate portion disposed between the first and second ends,
wherein plural piston cooling oil jets are provided, each pipe of the piston cooling oil passage comprising openings formed in the sidewall of the respective pipe in the intermediate portion thereof such than an opening is provided for each piston of the plural pistons; and
the second end of the second pipe is closed.

12. A cooling oil delivery structure for cooling a vehicular generator mounted on an engine,
the engine comprising:
a crankcase;
a crankshaft rotatably mounted in the crankcase, the generator disposed on one end of the crankshaft; and
a piston,
the cooling oil delivery structure comprising:
a piston cooling oil jet for jetting oil to the piston, and
a generator cooling oil jet that cools the generator by jetting oil onto the generator,
wherein the piston cooling oil jet and the generator cooling oil jet are supplied by a common oil supply passage.

13. The cooling oil delivery structure of claim 12, wherein the common oil supply passage is provided in the crankcase and arranged on an axis parallel to the crankshaft, and the piston cooling oil jet is disposed in an intermediate portion of the common oil supply passage, and the generator cooling oil jet is provided on an end of the common oil supply passage.

14. The cooling oil delivery structure for the vehicular generator according to claim 12, further comprising:
an engine speed sensor that detects the number of rotations of the crankshaft, the engine speed sensor arranged adjacent to a space around the generator toward which oil is jetted from the generator cooling oil jet.

15. The cooling oil delivery structure for the vehicular generator according to claim 12,
wherein the generator cooling oil jet is located adjacent the generator and outside an outer periphery of the generator when the oil jet is viewed in a direction viewing an end of the crankshaft, and the generator cooling oil jet jets oil in a direction substantially parallel to the crankshaft.

16. In combination, an internal combustion engine and a generator operatively mounted on said engine,
the engine comprising:
a crankcase;
a crankshaft rotatably mounted in the crankcase, wherein the generator is disposed at one end of the crankshaft;
a cylinder, and
a piston disposed in said cylinder,
the engine comprising a cooling oil delivery structure comprising:
a piston cooling oil passage formed in the crankcase and arranged on an axis substantially parallel to the crankshaft, the piston cooling oil passage having a piston cooling oil jet formed medially therein for jetting oil to the piston; and
a generator cooling oil jet provided on the crankcase at an end of, and in fluid communication with the piston cooling oil passage.

17. The combination of claim 16, further comprising:
an engine speed sensor that detects engine speed by sensing a number of rotations of the crankshaft during a time period, the engine speed sensor arranged adjacent a target space toward which oil is jetted from the generator cooling oil jet, wherein said target space is near the generator.

18. The combination of claim 16, wherein during engine operation, the generator cooling oil jet jets oil in a direction substantially parallel to the crankshaft.

19. The combination of claim 16, wherein the generator cooling oil jet comprises a nozzle cap member disposed on and surrounding a terminal end portion of the piston cooling oil passage.

20. The combination of claim 16, wherein the nozzle cap member has an inner end and an outer end, the inner end surrounding the terminal end portion of the piston cooling oil passage, and the outer end comprising a reduced diameter portion having a diameter which is smaller than a diameter of the inner end.

* * * * *